March 18, 1952          B. STORSAND          2,589,454
FLY WHEEL ENERGY STORAGE SYSTEM, PARTICULARLY
FOR ELECTRIC VEHICLES
Filed Oct. 15, 1948
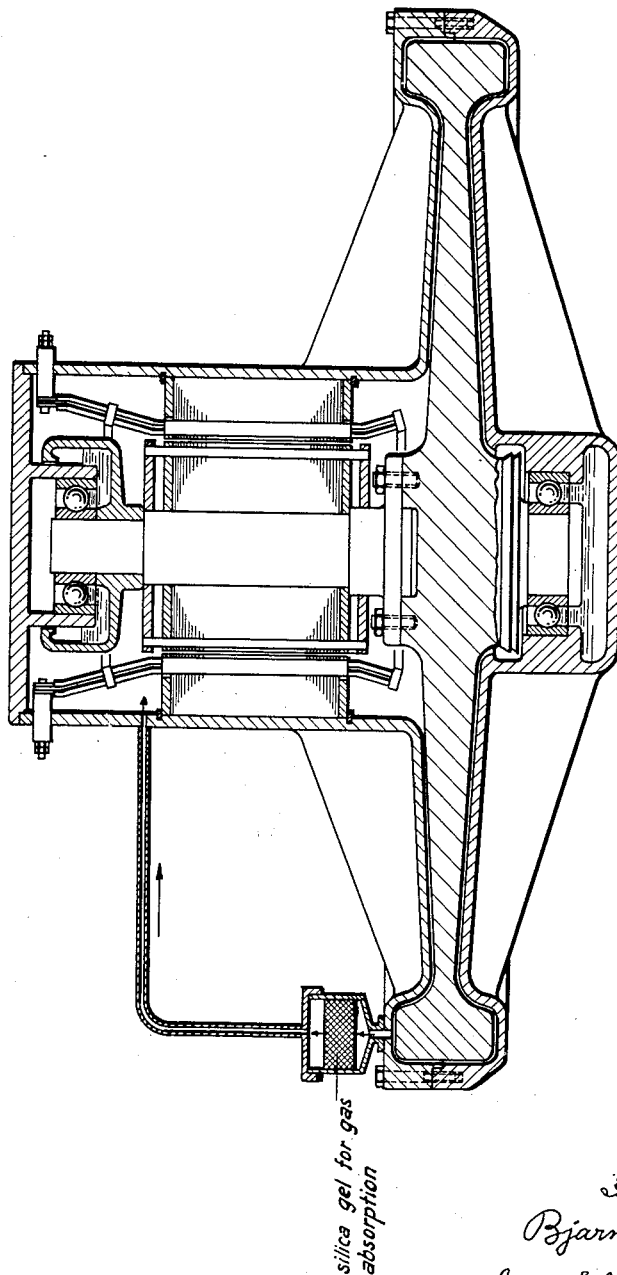
silica gel for gas absorption
Inventor
Bjarne Storsand
by Singer, Ehlert, Stern & Carlberg
Attorneys Patented Mar. 18, 1952

2,589,454

UNITED STATES PATENT OFFICE 2,589,454

FLYWHEEL ENERGY STORAGE SYSTEM, PARTICULARLY FOR ELECTRIC VEHICLES

Bjarne Storsand, Zurich, Switzerland, assignor to Maschinenfabrik Oerlikon, Zurich-Oerlikon, Switzerland Application October 15, 1948, Serial No. 54,742

1 Claim. (Cl. 171—252)

This invention relates to electric vehicles and is an improvement of the invention described and claimed in my copending application Serial Number 607,529.

In the specification of my said application S. N. 607,529 I have described and claimed an electric vehicle capable of running at least for a certain distance without the aid of a trolley wire, comprising a flywheel which is coupled with a combined motor-generator, which flywheel is caused to rotate by the temporary supply to said motor-generator of electrical energy from an extraneous stationary source of power, and the stored up rotational energy of which flywheel serves to drive the vehicle, said motor-generator being then driven by said flywheel and acting as a generator supplying energy to the traction motor or motors of the vehicle.

Moreover in the specification of my said application S. N. 607,529 I have described an embodiment of electric vehicle, in which the housing of the flywheel and motor generator coupled therewith is filled with a gas, advantageously hydrogen, which is lighter than air, for the purpose of reducing frictional losses and attaining a good cooling of the motor and its windings.

It has now been found that the vapours given off by the insulation of the windings increase the density of the gas in the housing and thus increases frictional losses. These vapours consist mainly of steam and hydrocarbon vapours of high molecular weight, which produce correspondingly high losses. Since these vapours, which arise from the solvents of the insulating lacquers used for insulating the windings of the motor-generator escape only slowly, it is impossible to produce any improvement by prolonged heating and evacuation.

The present invention aims at obviating this disadvantage.

To this end, the invention consists in adsorbing or absorbing the gases liberated during operation from the insulation of the windings. Suitable material for such adsorption or absorption has been found to be active carbon and silica gel.

The accompanying drawing shows the absorption medium located in a conduit connecting the high pressure zone of the flywheel portion of the casing with the low pressure zone of the dynamo-electric machine portion of the casing.

Having now particularly described and ascertained the nature of my said invention and in what manner the same is to be performed, I declare that what I claim is:

In an energy-storing system, an electrodynamic machine having a field structure, windings, and a rotatable armature, a flywheel secured to the armature at one end of the electrodynamic macine and extending with its circumference a considerable distance beyond the machine, a hermetically sealed housing enclosing the electrodynamic machine and extending radially outward thereof to enclose the flywheel, the housing being filled with a gas lighter than air, and conduit means external to the housing connecting an outward portion of the housing at the periphery of the flywheel and a portion of the housing at the end of the armature opposite to the end thereof secured to the flywheel, the conduit means serving for the circulation of the gas in the housing and containing a substance for absorbing hydrocarbon vapors released from insulating substances on the windings of the machine during its operation.

BJARNE STORSAND.

REFERENCES CITED

The following references are of record in the file of this patent:

UNITED STATES PATENTS

| Number | Name | Date |
|---|---|---|
| 1,686,027 | Newbury | Oct. 2, 1928 |
| 1,722,632 | Johnson | July 30, 1929 |
| 2,488,387 | Elsey | Nov. 15, 1949 |

OTHER REFERENCES

Design Features of Hydrogen-Cooled Turbine Generators by Snell in GE Review, February, 1939, vol. 42, No. 2, pages 78–80.